R. L. PATE.
DEVICE FOR CONTROLLING THE TEMPERATURE OF AUTOMOBILE RADIATORS.
APPLICATION FILED FEB. 10, 1917.
1,338,585.
Patented Apr. 27, 1920.
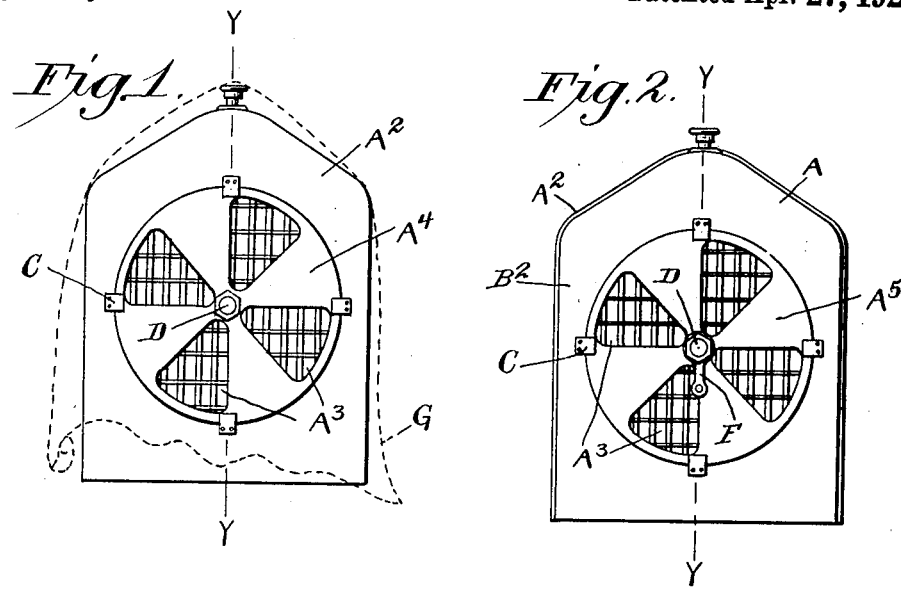
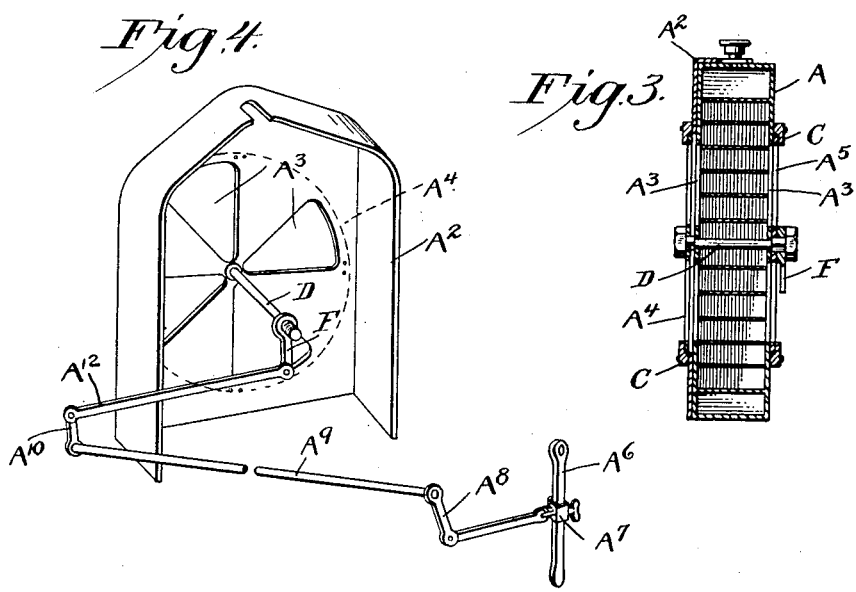
Fig.5.
Inventor:
Robert L. Pate;

UNITED STATES PATENT OFFICE.

ROBERT L. PATE, OF SPRINGFIELD, MISSOURI.

DEVICE FOR CONTROLLING THE TEMPERATURE OF AUTOMOBILE-RADIATORS.

1,338,585. Specification of Letters Patent. Patented Apr. 27, 1920.

Application filed February 10, 1917. Serial No. 147,826.

*To all whom it may concern:*

Be it known that ROBERT L. PATE, a citizen of the United States, residing at Springfield, in the county of Greene and State of Missouri, have invented certain new and useful Improvements in Devices for Controlling the Temperature of Automobile-Radiators, of which the following is a specification.

My invention relates to improvements in a device for controlling the temperature of an automobile radiator by regulating the amount of air admitted to the same. These objects I attain by means of the device illustrated in the accompanying drawings in which:—

Figure 1, is a front view of the device on the radiator of the automobile.

Fig. 2, is a back view of the same.

Fig. 3, is a vertical, longitudinal section on the line Y Y of Figs. 1 and 2.

Fig. 4, is a perspective view of the casing and the opening and closing device, detached from the radiator and showing the interior of the front casing from the rear.

Fig. 5, is a detail view of the axle of the ventilators.

Similar letters indicate corresponding parts in the several figures.

"A" represents an ordinary radiator of an automobile.

"A²" represents the front casing of the device to slip over or against the front of the radiator "A."

"B²" represents the back casing of the device fitting against the back of the radiator "A." These casings have openings, "A³," for the passage of air. The quantity of air through said openings "A³," is regulated by means of a ventilator, "A⁴," at the front and back of the radiator. Said ventilators are detachably connected by a shaft "D."

Said ventilators, "A⁴" and "A⁵," and casings "A²" and "B²," are made of any desired size and shape to cover the entire radiator or just the openings through the radiator, of metal, felt, mineral wool, composition of materials or any other suitable material, the same to act as a non-conductor of heat to assist in maintaining a uniform temperature of the radiator in cold weather and is detachable for warm weather or summer, when desired.

The ventilators, "A⁴" and "A⁵," are held in place by guide lugs, "C," and are operated by a device for opening the same on the starting of the engine and closing the same on the stopping of the engine, by any suitable connection with the same.

This object I accomplish preferably by the device illustrated in the detail view, Fig. 4, in which "A⁶" is the spark switch lever of the automobile, on which I place a sleeve, "A⁷," connected by levers with the ventilators for adjusting the amount of air which passes through the ventilators.

An automobile equipped with this device with the engine stopped (idle) the ignition or spark switch lever would be in a neutral position, (non-running position), the ventilators of this device would be closed, preventing any air passing into or through the radiator. To start the automobile engine, it would be necessary to move the ignition or spark switch lever. The moving of the ignition or spark switch lever to start the engine would open the ventilators of this device and allow the air to pass into and passes through the ventilators.

To stop the engine, the ignition or spark switch lever would be moved back to neutral, (non-running position). The moving of this ignition or spark switch lever back to neutral would stop the engine and close the ventilators of this device automatically, thereby excluding the cold air from the radiator and holding the warm air (created by the running engine) against the radiator, thereby keeping the radiator warm, less liable to freeze and more efficient.

This device therefore works in unison with the engine because the ventilators are connected with the ignition or spark switch lever, so when this ignition or spark switch lever is moved to start the automobile engine, it opens the ventilators of the device and closes the ventilators when the ignition or spark switch lever is moved to stop the engine of the automobile.

The stroke of the lever as it is moved back and forth, opens or closes the ventilators for the admission or exclusion of air to or through the openings in the radiator. The spark switch lever, "A⁶," when in a neutral position, the engine stands still, the ventilators are closed excluding the air. As this lever of the spark switch is moved to start the engine, the ventilators are opened to admit the air to and through the openings in the radiator.

This may be accomplished by any suitable means, I prefer to provide a link connecting the sleeve with a crank, "A⁸," secured upon a rock shaft, "A⁹," connecting with a crank, "A¹⁰," connecting with rod, "A¹²" and the crank "F," of the shaft "D," on which the ventilator or ventilators operate.

The ventilators, "A⁴" and "A⁵," are attached to the shaft, "D," in any suitable way for being operated by same. The closing of the ventilators on the stopping of the engine, excludes the air from the radiator and thus retains the heat in the radiator, prevents the water from freezing and enables the engine to start easily and quickly.

In summer the radiator requires much more air than in cold weather and this device, when used in cold weather, admits only such amount of air as is needed.

I have also used this device in connection with a laprobe or covering, "G," as shown by dotted lines in Fig. 1, to assist in excluding the cold and retaining the heat in the radiator when the engine is idle.

The front case, "A²," may be made as a cap to cover the entire radiator or it may be made to cover only such part of the radiator as may be desired.

The front case, "A²," may be used with its ventilator, "A⁴," without the back casing, "B²" or ventilator, "A⁵," when desired, but I prefer them both for complete regulating of the quantity of air to and through the radiator as described.

Having thus described my invention, what I desire to secure by Letters Patent of the United States, is:

1. The combination with the radiator and ignition switch lever of an automobile, of a movable ventilator arranged upon one side of the radiator to control the volume of air passing therethrough, and operative connecting means between the movable ventilator and the ignition switch lever whereby the ventilator and ignition switch lever move in unison so that the ventilator is closed when the ignition switch lever is in a neutral position and is open when such lever is in the engine operating or running position.

2. The combination with the radiator and ignition switch lever of an automobile, of a rock shaft extending through the radiator and projecting upon opposite sides thereof, rotatable ventilators secured to the rock shaft and arranged upon opposite sides of the radiator, and operative connecting means between the ignition switch lever and the rock shaft so that they move in unison.

3. The combination with the radiator and ignition switch lever of an automobile, of a casing adapted to receive the radiator and adapted to retain the same at a proper temperature, said casing having an inlet opening arranged upon one side of the radiator, a movable ventilator to cover and uncover the opening, a member longitudinally adjustably mounted upon the ignition switch lever to be shifted toward and away from the pivot of the lever, and operative connecting means between the member and the ventilator so that the ventilator is in a closed position when the lever is in the neutral position and the ventilator is in the open position when the lever is in the engine operating or running position.

In testimony whereof, I affix my signature in presence of two witnesses.

ROBERT L. PATE.

Witnesses:
 GEORGE J. ROUNTREE,
 ELLIS KISER.